United States Patent [19]

Koyama et al.

[11] Patent Number: 5,435,702
[45] Date of Patent: Jul. 25, 1995

[54] HERMETIC COMPRESSOR

[75] Inventors: Takashi Koyama, Chigasaki; Takao Yoshimura, Kamakura; Hironari Akashi; Masao Mangyo, both of Fujisawa; Takeshi Ohno, Chigasaki; Ichiro Kita, Fujisawa; Junichiro Yabiki, Chigasaki, all of Japan

[73] Assignee: Matsushita Refrigeration Company, Osaka, Japan

[21] Appl. No.: 12,921

[22] Filed: Feb. 3, 1993

[51] Int. Cl.⁶ ............................................. F04B 35/04
[52] U.S. Cl. ........................... 417/410.1; 417/902; 310/51
[58] Field of Search ............... 417/410 R, 902; 310/51

[56] References Cited

U.S. PATENT DOCUMENTS

| | | | |
|---|---|---|---|
| 4,106,881 | 8/1978 | Stannow et al. | 310/51 |
| 4,592,703 | 6/1986 | Inaba et al. | 417/902 |
| 4,984,971 | 1/1991 | Bergeron | 417/902 |
| 5,022,146 | 6/1991 | Gannaway et al. | 417/902 |
| 5,252,038 | 10/1993 | Mangyo et al. | 417/902 |

FOREIGN PATENT DOCUMENTS

| | | |
|---|---|---|
| 0317056 | 5/1989 | European Pat. Off. . |
| 761672 | 7/1949 | Germany . |
| 49-18245 | 5/1974 | Japan . |
| 58-24633 | 5/1983 | Japan . |
| 1573649 | 8/1980 | United Kingdom . |

Primary Examiner—Richard A. Berisch
Assistant Examiner—Charles G. Freay
Attorney, Agent, or Firm—Pollock, Vande Sande & Priddy

[57] ABSTRACT

A compressor equipped with a compressing unit comprising a compressing section and a motor section which are connected to each other and which are encased in a closed vessel, the compressing section including a crank shaft rotatable so that a piston reciprocates within a cylinder and the motor section comprising a rotor and stator and disposed at a lower side of the compressing section, the rotor being connected to the crank shaft so that the crank shaft is rotatable in response to driving of the motor section. Springs are provided between the compressing unit and the closed vessel so as to elastically support the compressing section and the motor section, and first and second balance weights are respectively provided on upper and lower portions of a rotor of the motor section. The first and second balance weights are determined on the basis of the resultant load to be applied to an eccentric portion of the crank shaft, a con'rod and the piston, the loads of the first and second balance weights and distances among the first and second balance weights and the eccentric portion of the crank shaft.

7 Claims, 6 Drawing Sheets

HERMETIC COMPRESSOR

BACKGROUND OF THE INVENTION

The present invention relates to reciprocating and hermetic compressors applicable to refrigerating systems and others.

Figure 1:
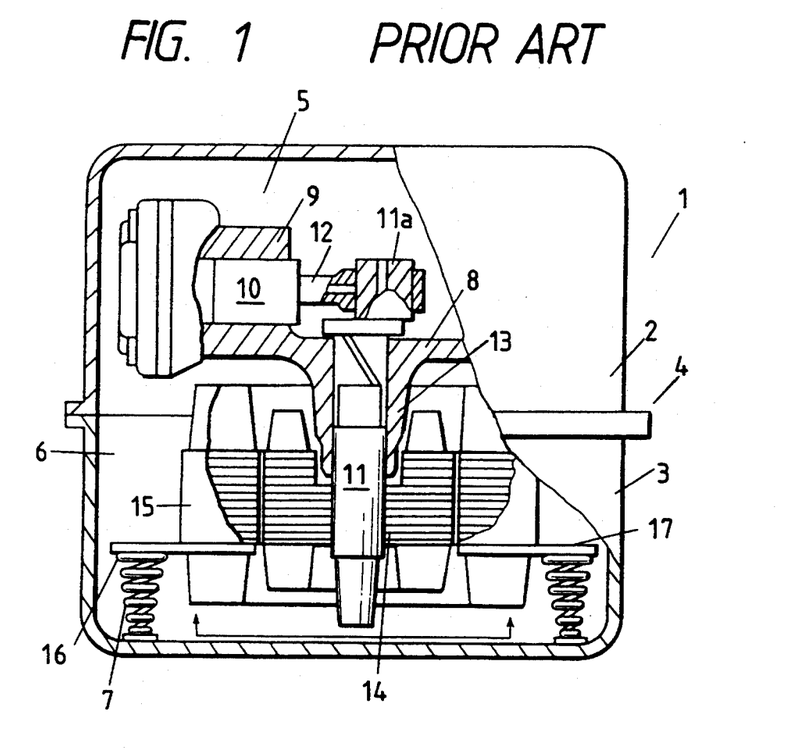
FIG. 1 is a cross-sectional view showing an arrangement of a conventional hermetic compressor.

One of the major problems arising in the use of hermetic compressors is occurrence of noises and vibrations. Recently, improvement for such hermetic compressors is being made for the noise- and vibration-reduction purposes. One known noise and vibration reduction technique is disclosed in the Japanese Utility Model Publication No. 49-18245 where a compressing unit is elastically supported by springs with respect to a closed vessel. This prior art technique will be described hereinbelow with reference to FIG. 1 which is a cross-sectional view showing a conventional hermetic compressor. In FIG. 1, designated at numeral 1 is a hermetic compressor which is equipped with a compressing unit comprising a compressing section 5 and a motor section 6 which are encased in a closed vessel 4 Comprising an upper shell 2 and a lower shell 3. The compressing section 5 is constructed with a cylinder 9 formed in a block 8, a piston 10 associated with the cylinder 9, a crank shaft 11 having a crank eccentric portion (crank pin) 11a, a con'rod 12 coupled to the crank shaft 11, and a bearing 13 provided on the block 8 to support the crank shaft 11. Further, the motor section 6 is constructed with a rotor 14 and stator 15, the rotor 14 being fixedly shrinkage-fitted to the crank shaft 11 and the stator 15 being fixedly secured through screws to the block 8. In addition, on a lower end portion of the stator 15 there is provided a spring-mounting plate 17 having studs 16. Springs 7 are placed between the studs 16 and the lower shell 3 so as to elastically support the compressing section 5 and the motor section 6.

With this arrangement, when vibrations of the compressing unit occur in response to the refrigerant-compressing operation of this compressor, the springs 7 can attenuate the vibrations before the propagation to the closed vessel 4 to thereby suppress the occurrence of noises due to the vibration of the closed vessel 4.

There is a problem which arises with such a conventional compressor arrangement, however, in that a moment can be generated and applied to the crank shaft 11 due to the balance configuration of the compressing unit relative to the supporting position and hence difficulty is actually encountered to sufficiently suppress the vibration of the closed vessel.

Further, the Japanese Patent Publication No. 58-24633 discloses a technique in which a balance weight is provided at the vicinity of the crank eccentric portion 11a of the crank shaft 11. However, this arrangement cannot also sufficiently suppress the generation of the moment in the crank shaft 11.

SUMMARY OF THE INVENTION

It is therefore an object of the present invention to provide a hermetic compressor which is capable of sufficiently suppressing the occurrence of noises resulting from the generation of the vibrations of the compressing unit.

In accordance with the present invention, there is provided a compressor comprising: a compressing section including a crank shaft having a crank eccentric portion, a con'rod and a piston, the piston being coupled through the con'rod to the crank eccentric portion of the crank shaft and inserted into a cylinder, and the crank eccentric portion being arranged to circularly move with respect to the axis of the crank shaft in accordance with rotation of the crank shaft to cause the piston to reciprocate within the cylinder; a motor section comprising a rotor and stator and disposed at a lower side of the compressing section, the rotor being connected to the crank shaft so that the crank shaft is rotatable in response to the drive of the motor section; and first and second balance weights respectively provided on upper and lower portion of the rotor of the motor section, the first balance weight being positioned in a plane II perpendicular to the axis of the crank shaft and separated by a distance X from a plane I perpendicular to the axis of the crank shaft and including the axis of the piston, and the second balance weight being positioned in a plane III perpendicular to the axis of the crank shaft and separated by a distance Y from the plane II, wherein, when a resultant force of an inertia force of the piston, an inertia force and centrifugal force of the con'rod, and a centrifugal force of the crank eccentric portion in the plane I is taken to be Fa, a centrifugal force of the first balance weight in the plane II is taken to be Fb, and a centrifugal force of the second balance weight in the plane III is taken as Fc, the first and second balance weights are determined so that all of coefficients C1 to C3 given by the following equations become below 3.

$$C1 = Fc \cdot (X+Y)/(Fb \cdot X) \quad (A)$$

$$C2 = Fc \cdot Y/(Fa \cdot X) \quad (B)$$

$$C3 = Fb \cdot Y/(Fa \cdot (X+Y)) \quad (C)$$

The compressing section and the motor section are encased in a vessel and supported at the vicinity of the plane III through spring means with respect to the vessel, the first and second balance weights are determined so that the coefficient C1 given by the equation (A) is below 1.5 and the following equations are satisfied:

$$|C2MAX-1| < |C2MIN-1|$$

$$|C3MAX-1| < |C3MIN-1|$$

where C2MAX and C2MIN respectively represent maximum and minimum values of the coefficient C2 given in accordance with the equation (B) during one revolution of the crank shaft, and C3MAX and C3MIN respectively designate maximum and minimum values of the coefficient C3 given in accordance with the equation (C) during one revolution of the crank shaft. It is appropriate that the compressing section and the motor section are encased in a vessel and supported at the vicinity of the plane II through spring means with respect to the vessel, the first and second balance weights are determined so that the coefficient C1 given by the equation (A) is $1 \pm 0.5$ and the following equations are satisfied:

$$|C2MAX-1| \approx |C2MIN-1|$$

$$|C3MAX-1| \approx |C3MIN-1|$$

It is also appropriate that the compressing section and the motor section are encased in a vessel and supported at the vicinity of the plane I through spring means with respect to the vessel, the first and second balance weights are determined so that the coefficient C1 given by the equation (A) is equal to or greater than 0.5 and the following equations are satisfied:

$$|C2MAX-1| > |C2MIN-1|$$

$$|C3MAX-1| > |C3MIN-1|$$

Further, according to this invention, there is provided a compressor comprising: a compressing section including a crank shaft rotatable so that a piston reciprocates within a cylinder; a motor section comprising a rotor and stator and disposed at a lower side of the compressing section, the rotor being connected to the crank shaft so that the crank shaft is rotatable in response to the drive of the motor section, the stator having at its lower end portion a spring-mounting plate; spring means disposed between the spring plate and a closed vessel for encasing the compressing section and the motor section so as to elastically support the compressing section and the motor section; and first and second balance weights respectively provided on the upper and lower portions of a rotor of the motor section.

In addition, according to this invention, there is provided a compressor comprising: a compressing section including a crank shaft having a crank pin, a con'rod and a piston, the piston being coupled through the con'-rod to the crank pin of the crank shaft in a first plane I perpendicular to the axis of the crank shaft, the crank pin being arranged to circularly move with respect to the axis of the crank shaft in accordance with rotation of the crank shaft to cause the piston to reciprocate within a cylinder, a portion consisting of the crank pin, the con'rod and the piston has the center of gravity at a position separated by a distance rk from the axis of the crank shaft; a motor section connected to a lower side of the compressing section and comprising a rotor and a stator, the rotor being connected to the crank shaft so that the crank shaft is rotatable in response to the drive of the motor section; and first and second balance weights respectively provided on upper and lower portion of the rotor of the motor section, the first balance weight being positioned in a second plane II, perpendicular to the axis of the crank shaft and existing between the first plane I and a reference plane O, perpendicular to the axis of the crank shaft and passing through the center of gravity of a combination of the compressing section and the motor section, and first balance weight having the center of gravity at a position separated by a distance rb from the axis of the crank shaft, and the second balance weight being positioned in a third plane III perpendicular to the axis of the crank shaft and existing at the opposite side to the first plane I with respect to the reference plane O, and the second balance weight having the center of gravity at a position separated by a distance rc from the axis of the crank shaft; and spring means for elastically supporting the compressing section and the motor section in a fourth plane IV perpendicular to the axis of the crank shaft and existing at the opposite side to the first plane I with respect to the reference plane O, wherein, when a mass of the portion consisting of the crank pin, the con'rod and the piston is taken to be M, a mass of the first balance weight is taken as mb and a mass of the second balance weight is taken as mc, the first and second balance weights are determined on the basis of the product $mb \cdot rb$, the product $mc \cdot rc$ and the product $M \cdot rk$.

More specifically, the first and second balance weights are determined so that values Nb and Nc given in accordance with the following equations are respectively in first and second predetermined ranges:

$$Nb = mb \cdot rb / M \cdot rk$$

$$Nc = mc \cdot rc / M \cdot rk$$

Preferably, the first predetermined range is 0.8 to 1.2 and the second predetermined range is 0.1 to 0.5.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 2:
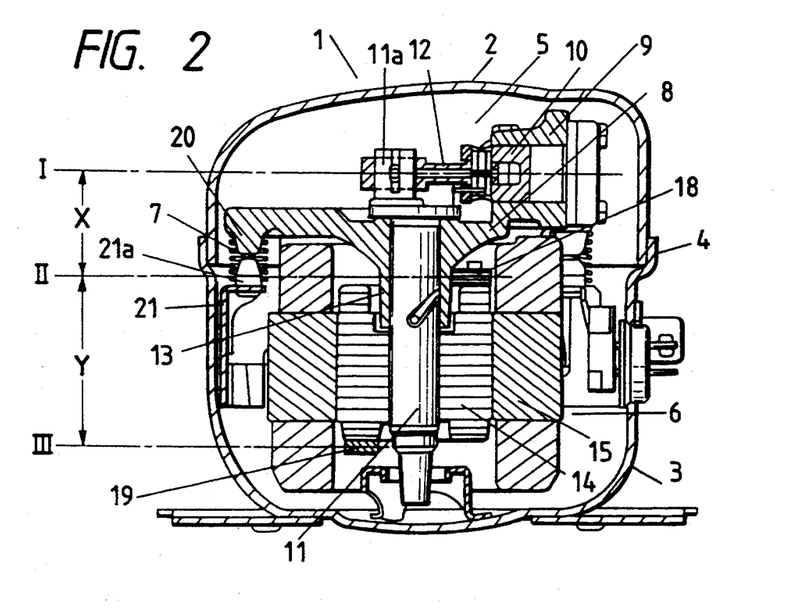
FIG. 2 is a cross-sectional view showing an arrangement of a hermetic compressor according to a first embodiment of the present invention.

Referring now to FIG. 2, a description will be made hereinbelow in terms of an arrangement of a hermetic compressor according to a first embodiment of the present invention. In FIG. 2, parts corresponding to those in FIG. 1 are marked with the same numerals. The hermetic compressor, being designated at numeral 1, is similarly equipped with a compressing unit comprising a compressing section 5 and a motor section 6 which are encased in a closed vessel 4 comprising an upper shell 2 and a lower shell 3. The compressing section 5 is constructed with a cylinder 9 formed in a block 8, a piston 10 associated with the cylinder 9, a crank shaft 11 having a crank eccentric portion 11a at its end portion, a con'rod 12 coupled to the crank eccentric portion 11a of the crank shaft 11 and further connected to the piston 10, and a bearing 13 provided on the block 8 to support the crank shaft 11. The piston 10 is arranged so that its central axis is substantially perpendicular to the axis of the crank shaft 11. The crank shaft 11 is arranged to be rotatable about its own axis so that the crank eccentric portion 11a rotationally moves with respect to the axis of the crank shaft 11. In response to the rotational movement of the crank eccentric portion 11a, the con'rod 12 is linearly moved so that the piston 10 reciprocates in the cylinder 9. Further, the motor section 6 is constructed with a rotor 14 and stator 15, the rotor 14 being fixedly secured to the crank shaft 11 and the stator 15 being provided at the periphery of the rotor 14 to be fixedly secured through screws to the block 8. The crank shaft 11 is coaxially disposed at the center portion of the motor section 6.

In this embodiment, an upper balance weight 18 is disposed at an upper portion of the rotor 14 and a lower balance weight 19 is disposed at a lower portion of the rotor 14, the upper and lower balance weights 18 and 19 being different by 180° in angular position and the lower balance weight 19 being substantially equal in angular position to each other. Further, studs 20 are integrally provided on the block 8, and stays 21 are fixedly secured to the lower shell 3 and equipped with pins 21a. A spring 7 is set and disposed between the stud 20 and the pin 21a of the stay 21 so as to elastically support the compressing section 5 and the motor section 6 of the compressor 1.

Here, a description will be made in terms of the determination of the weights and configurations (shapes) of the upper and lower balance weights 18 and 19. First, we consider the plane I perpendicular to the axis of the crank shaft 11 and including (passing through) the central axis of the piston 10, the plane II perpendicular to the axis of the crank shaft 11 and including the center of gravity of the upper balance weight 18 and the plane III perpendicular to the axis of the crank shaft 11 and including the center of gravity of the lower balance weight 19. The distance between the planes I and II is X and the distance between the planes II and III is Y. When the resultant force comprising components of the inertia force of the piston 10, the inertia force and centrifugal force of the con'rod 12 and the centrifugal force of the crank eccentric portion 11a on the plane I is taken to be Fa, the centrifugal force of the upper balance weight 18 on the plane II is taken to be Fb, and the centrifugal force of the lower balance weight 19 on the plane III is taken as Fc. The weights and configurations (shapes) of the upper and lower balance weights 18 and 19 are determined so that all the coefficients C1 to C3 given by the following equations (1) to (3) becomes below 3.

$$C1 = Fc \cdot (X+Y)/(Fb \cdot X) \quad (1)$$

$$C2 = Fc \cdot Y/(Fa \cdot X) \quad (2)$$

$$C3 = Fb \cdot Y/(Fa \cdot (X+Y)) \quad (3)$$

Figure 3:
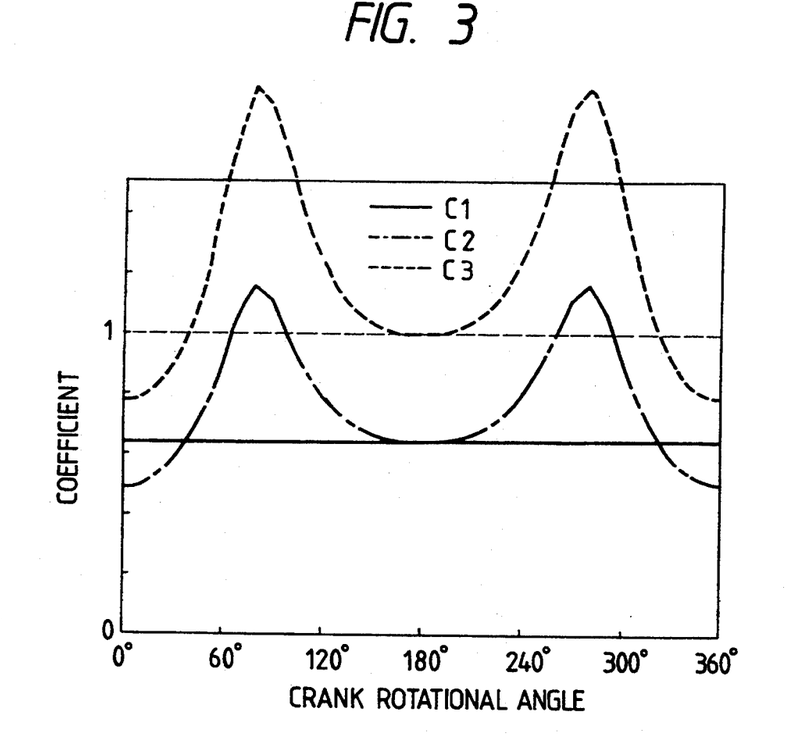
FIG. 3 is a graphic illustration for describing variations of coefficients due to rotation of a crank shaft of the hermetic compressor in the first embodiment of this invention.

In operation, in response to driving the motor section 6, the crank shaft 11 rotates so that the crank eccentric portion 11a circularly rotates with respect to the axis of the crank shaft 11. Thus, the piston 10 connected through the con'rod 12 to the crank eccentric portion 11a reciprocates within the cylinder 9 to compress the refrigerant. Accordingly, the resultant force Fa of the centrifugal force of the crank eccentric portion 11a due to the rotation, the reciprocating inertia force of the piston 10 and the centrifugal force and reciprocating inertia force of the con'rod 12 is applied on the above-mentioned plane I. Because of variations of the reciprocating inertia force of the piston 10 and the centrifugal force and reciprocating force of the con'rod 12 during one revolution of the crank shaft 11, the resultant force Fa does not become a constant load but becomes a variable load having the periodicity corresponding to one revolution of the crank shaft 11. On the other hand, because the distances between the centers of gravity of the upper and lower balance weights 18 and 19 and the rotation axis of the crank shaft 11 are fixed and the weights of the upper and lower balance weights 18 and 19 are also fixed, the centrifugal force Fb of the upper balance weight 18 and the centrifugal force Fc of the lower balance weight 19 do not vary during one revolution of the crank shaft 11. Thus, as shown in FIG. 3, only the coefficient C1 becomes constant during one revolution of the crank shaft 11, and the other coefficients C2 and C3 respectively vary during one revolution of the crank shaft 11.

Here, the dynamic (kinematic) balance of the compressor 1 can be kept to the most desirable state when all the coefficients C1 to C3 are 1. In other words, a moment due to the loads Fa to Fc is not generated with respect to the crank shaft 11 when taking that condition. However, in the case that the compressor is of the reciprocating type, in practice difficulty is encountered to perfectly assume the dynamic balance therebetween during one revolution of the crank shaft 11. But, according to tests of the inventors, it has been found that, when all the coefficients C1 to C3 are below 3, the moment to be generated due to the loads Fa to Fc and applied to the crank shaft 11 relatively becomes small. Thus, if setting the coefficients C1 to C3 to be below 3 in addition to elastically supporting the compressing section 5 and the motor section 6 through the springs 7, it is possible to suppress the generation of noises resulting from the vibration of the closed vessel 4. According to the tests, the respective coefficients C1 to C3 become below 3 in the case that the cylinder volume is above 10 cm³, become below 2.5 when the cylinder volume is 6 to 10 cm³, and become below 2 when the cylinder volume is below 6 cm³.

Figure 4:
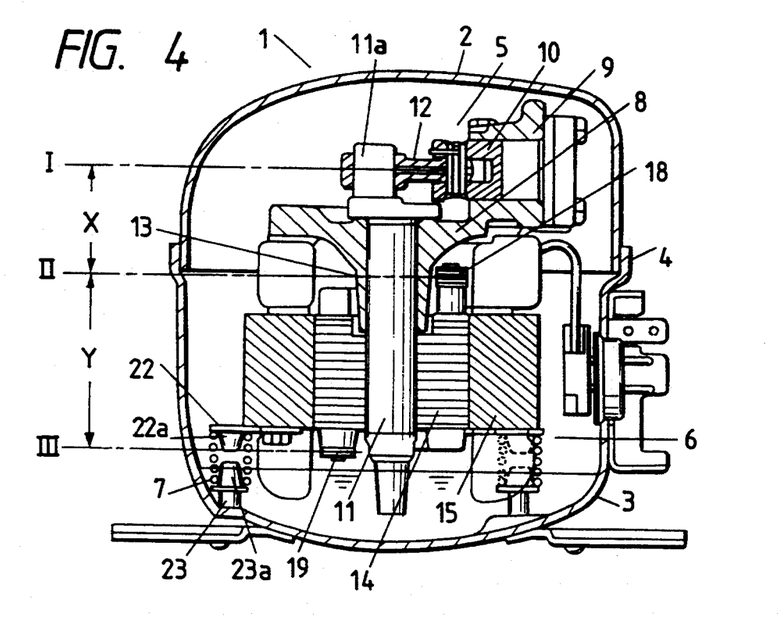
FIG. 4 is a cross-sectional view showing an arrangement of a hermetic compressor according to a second embodiment of this invention.

FIG. 4 is a cross-sectional view showing an arrangement of a hermetic compressor according to a second embodiment of this invention where parts corresponding to those in FIG. 2 are marked with the same numerals and the description will be omitted for brevity. In FIG. 4, one feature of this embodiment is that a holder 22 is fixedly secured through screws to the lower surface of the stator 15 and stays 23 are fixedly welded onto the lower shell 3, the holder 22 being equipped with studs 22a which are in turn inserted into springs 7 and the stay 23 being equipped with pins 23a which are also inserted into the springs 7. The springs 7 are set and disposed between the holder 22 and the stays 23 by means of the studs 22a and the pins 23a, whereby it is possible to elastically support the compressing section 5 and the motor section 6. The holder 22 is arranged such that the studs 22a are placed at the vicinity of the plane III perpendicular to the axis of the crank shaft 11 and passing through the center of gravity of the lower balance weight 19.

In this embodiment, the weights and configurations of the upper and lower weight balances 18 and 19 are determined so as to satisfy the following equation (4) or (5) under the condition that the coefficient C1 given in accordance with the above-mentioned equation (1) is below 1.5.

$$|C2MAX-1| < |C2MIN-1| \qquad (4)$$

$$|C3MAX-1| < |C3MIN-1| \qquad (5)$$

where C2MAX and C2MIN respectively represent the maximum value and minimum value of the coefficient C2 given in accordance with the above-mentioned equation (2) during one revolution of the crank shaft 11, and C3MAX and C3MIN respectively designate the maximum value and minimum value of the coefficient C3 given in accordance with the above-mentioned equation (3) during one revolution of the crank shaft 11.

Figure 5:
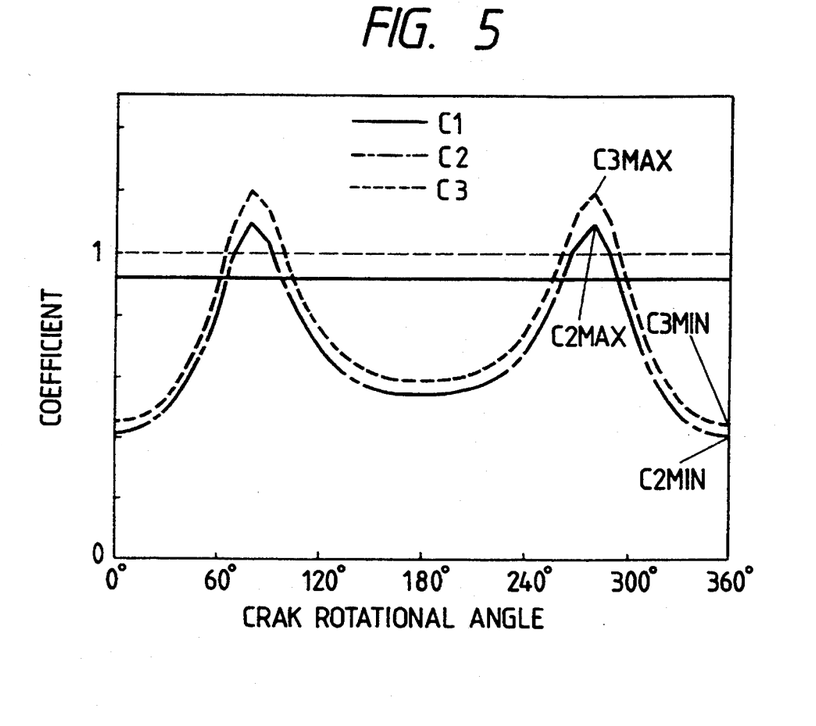
FIG. 5 is a graphic illustration for describing variations of coefficients due to rotation of a crank shaft of the hermetic compressor in the second embodiment of this invention.

In operation, as well as in the above-described first embodiment, in response to driving the motor section 6, the crank shaft 11 rotates so that the crank eccentric portion 11a circularly rotates with respect to the axis of the crank shaft 11. Thus, the piston 10 connected through the con'rod 12 to the crank eccentric portion 11a reciprocates within the cylinder 9 to compress the refrigerant. Accordingly, the resultant force Fa of the centrifugal force of the crank eccentric portion 11a due to the rotation, the reciprocating inertia force of the piston 10 and the centrifugal force and reciprocating inertia force of the con'rod 12 is applied on the above-mentioned plane I. Because of variations of the reciprocating inertia force of the piston 10 and the centrifugal force and reciprocating force of the con'rod 12 during one revolution of the crank shaft 11, the resultant force Fa does not become a constant load but becomes a variable load having the periodicity corresponding to one revolution of the crank shaft 11. On the other hand, because the distances between the centers of gravity of the upper and lower balance weights 18 and 19 and the rotation axis of the crank shaft 11 are fixed and the weights of the upper and lower balance weights 18 and 19 are also fixed, the centrifugal force Fb of the upper balance weight 18 and the centrifugal force Fc of the lower balance weight 19 do not vary during one revolution of the crank shaft 11. Thus, as shown in FIG. 5, only the coefficient C1 becomes constant during one revolution of the crank shaft 11, and the other coefficients C2 and C3 respectively vary during one revolution of the crank shaft 11 so as to take the maximum values C2MAX, C3MAX and the minimum values C2MIN, C3MIN.

Here, although as described above, the dynamic (kinematic) balance of the compressor 1 can be kept to the most desirable state when all the coefficients C1 to C3 are 1, that is, a moment due to the loads Fa to Fc is not generated with respect to the crank shaft 11 when taking that condition, in the case that the compressor is of the reciprocating type, in practice difficulty is encountered to perfectly assume the dynamic balance therebetween during one revolution of the crank shaft 11. However, if setting the coefficient C1 to below 1.5 and satisfying the aforementioned equations (4) and (5), the compressing unit takes a vibration mode where vibration becomes small at the vicinity of the plane III and becomes large at the upper portion of the crank shaft 11, because the force (moment) applied to the upper portion of the crank shaft 11 becomes greater and the force (moment) applied to the lower portion of the crank shaft 11, i.e., the vicinity of the lower balance weight 19, become smaller. In this embodiment, since the compressing section 5 and the motor section 6 are supported through the springs 7 at the vicinity of the plane III in which the vibration is small, it becomes possible to further suppress the generation of noises due to the vibration from the compressing unit to the closed vessel 4 as compared with the above-described first embodiment.

Figure 6:
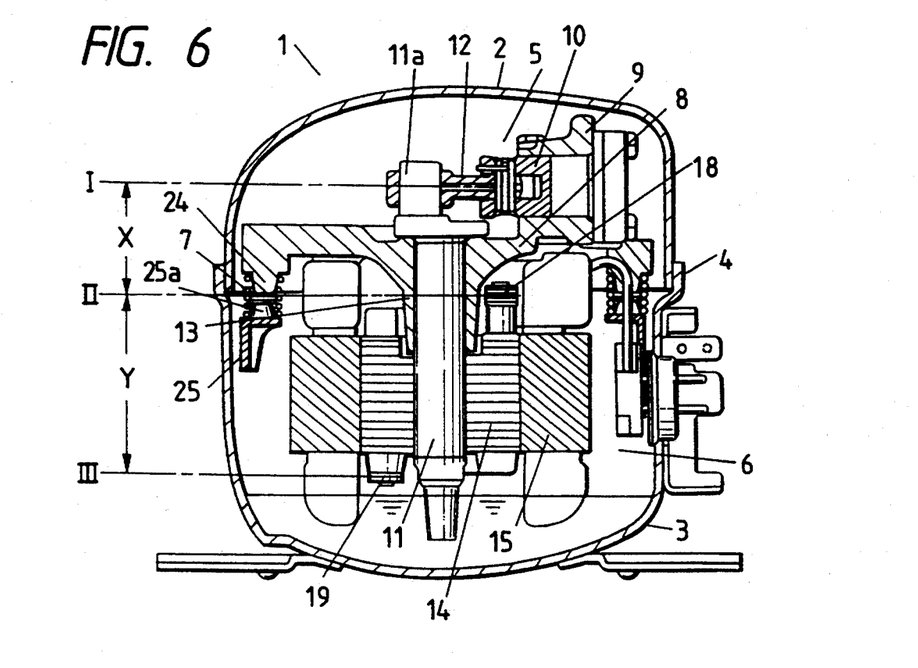
FIG. 6 is a cross-sectional view showing an arrangement of a hermetic compressor according to a third embodiment of this invention.

FIG. 6 is a cross-sectional view showing an arrangement of a hermetic compressor according to a third embodiment of this invention where parts corresponding to those in FIG. 2 or 4 are marked with the same numerals and the description thereof will be omitted for brevity. In FIG. 6, one feature of this embodiment is that studs 24 are provided on the block 8 and positioned at the vicinity of the plane II perpendicular to the axis of the crank shaft 11 and passing through the center of gravity of the upper balance weight 18, and stays 25 are fixedly welded onto the lower shell 3 so that springs 7 are disposed between the studs 24 of the block 8 and pins 25a of the stays 25 whereby the springs 7 elastically support the compressing section 5 and the motor section 6.

In this embodiment, the weights and configurations of the upper and lower balance weights 18 and 19 are determined so as to satisfy the following equations (6) and (7) (showing that $|C2MAX-1|$ is approximately equal to $|C2MIN-1|$ and $|C3MAX-1|$ are approximately equal to $|C3MIN-1|$) under the condition that the coefficient C1 given by the above-mentioned equation (1) is $1\pm0.5$.

$$|C2MAX-1| \approx |C2MIN-1| \qquad (6)$$

$$|C3MAX-1| \approx |C3MIN-1| \qquad (7)$$

where C2MAX and C2MIN respectively represent the maximum value and minimum value of the coefficient C2 given in accordance with the above-mentioned equation (2) during one revolution of the crank shaft 11, and C3MAX and C3MIN respectively designate the maximum value and minimum value of the coefficient C3 given in accordance with the above-mentioned equation (3) during one revolution of the crank shaft 11.

Figure 7:
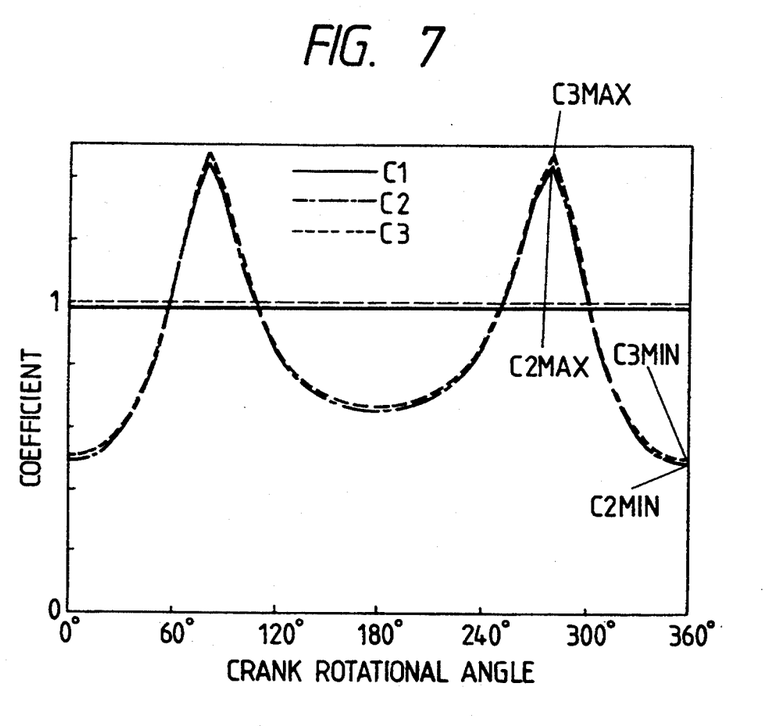
FIG. 7 is a graphic illustration for describing variations of coefficients due to rotation of a crank shaft of the hermetic compressor in the third embodiment of this invention.

In operation, as well as in the above-described first embodiment, when the motor section 6 is driven, the crank shaft 11 rotates so that the crank eccentric portion 11a circularly rotates with respect to the axis of the crank shaft 11. Thus, the piston 10 connected through the con'rod 12 to the crank eccentric portion 11a reciprocates within the cylinder 9 to compress the refrigerant. Accordingly, the resultant force Fa of the centrifugal force of the crank eccentric portion 11a due to the rotation, the reciprocating inertia force of the piston 10 and the centrifugal force and reciprocating inertia force of the con'rod 12 is applied on the above-mentioned plane I. Because of variations of the reciprocating inertia force of the piston 10 and the centrifugal force and reciprocating force of the con'rod 12 during one revolution of the crank shaft 11, the resultant force Fa does not become a constant load but becomes a variable load having the periodicity corresponding to one revolution of the crank shaft 11. On the other hand, because the distances between the centers of gravity of the upper and lower balance weights 18 and 19 and the rotation axis of the crank shaft 11 are fixed and the weights of the upper and lower balance weights 18 and 19 are also fixed, the centrifugal force Fb of the upper balance weight 18 and the centrifugal force Fc of the lower balance weight 19 do not vary during one revolution of the crank shaft 11. Thus, as shown in FIG. 7, only the coefficient C1 becomes constant during one revolution of the crank shaft 11, and the other coefficients C2 and C3 respectively vary during one revolution of the crank shaft 11 so as to take the maximum values C2MAX, C3MAX and the minimum values C2MIN, C3MIN.

Here, as described above, in the case that the compressor is of the reciprocating type, in practice difficulty is encountered to perfectly assume the dynamic balance therebetween during one revolution of the crank shaft 11. However, if setting the coefficient C1 to $1 \pm 0.5$ and satisfying the aforementioned equations (6) and (7), the compressing unit takes a vibration mode where the node of vibration appears at the vicinity of the plane II, because the moments substantially equal to each other and opposite in direction to each other are respectively applied to both the upper and lower portions of the crank shaft 11. In this embodiment, since the compressing section 5 and the motor section 6 are supported through the springs 7 at the vicinity of the plane II where vibration is small, it becomes possible to further suppress the generation of noises due to the vibration from the compressing unit to the closed vessel 4 as compared with the above-described first embodiment.

Figure 8:
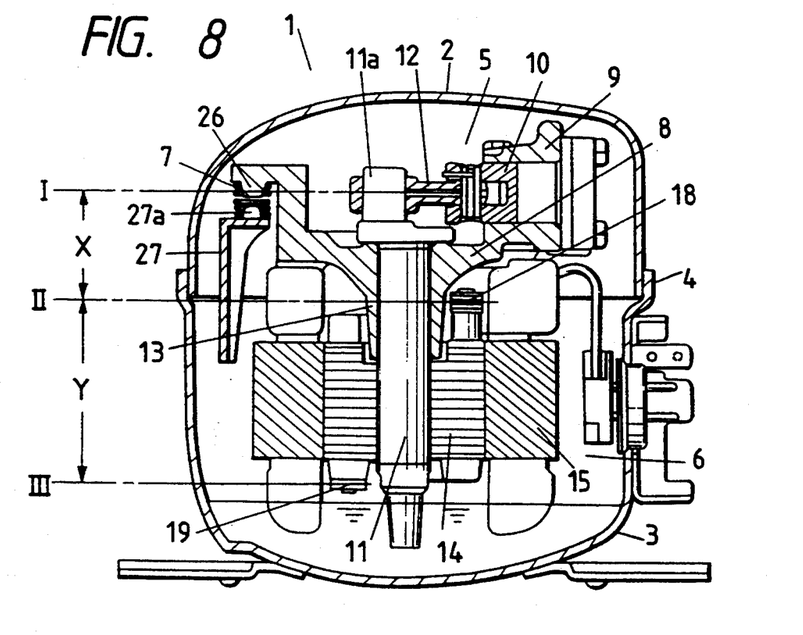
FIG. 8 is a cross-sectional view showing an arrangement of a hermetic compressor according to a fourth embodiment of this invention.

FIG. 8 is a cross-sectional view showing an arrangement of a hermetic compressor according to a fourth embodiment of this invention where parts corresponding to those in FIG. 2, 4 or 6 are marked with the same numerals and the description thereof will be omitted for brevity. In FIG. 8, one feature of this embodiment is that studs 26 are provided on the block 8 and positioned at the vicinity of the plane I perpendicular to the axis of the crank shaft 11 and passing through the central axis of the piston 10, and stays 27 are fixedly welded onto the lower shell 3 and equipped with pin 27a so that springs 7 are disposed between the studs 26 and the pins 27a of the stays 27 so as to elastically support the compressing section 5 and the motor section 6.

In this embodiment, the weights and configurations of the upper and lower balance weights 18 and 19 are determined so as to satisfy the following equations (8) and (9) under the condition that the coefficient C1 given by the above-mentioned equation (1) is above 0.5.

$$|C2MAX-1| > |C2MIN-1| \quad (8)$$

$$|C3MAX-1| > |C3MIN-1| \quad (9)$$

where C2MAX and C2MIN respectively represent the maximum value and minimum value of the coefficient C2 given in accordance with the above-mentioned equation (2) during one revolution of the crank shaft 11, and C3MAX and C3MIN respectively designate the maximum value and minimum value of the coefficient C3 given in accordance with the above-mentioned equation (3) during one revolution of the crank shaft 11.

Figure 9:
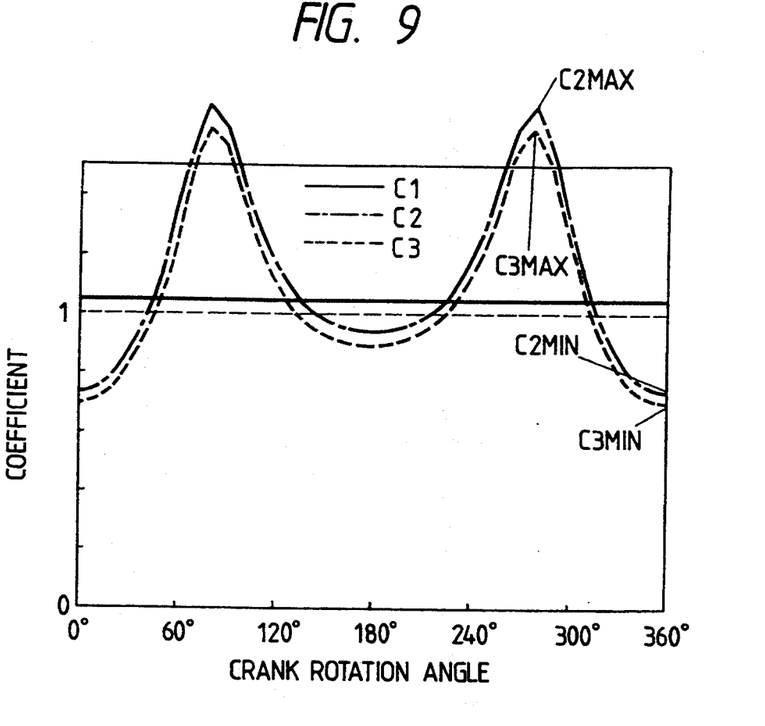
FIG. 9 is a graphic illustration for describing variations of coefficients due to rotation of a crank shaft of the hermetic compressor in the fourth embodiment of this invention.

As described above, the resultant force Fa of the centrifugal force of the crank eccentric portion 11a due to the rotation, the reciprocating inertia force of the piston 10 and the centrifugal force and reciprocating inertia force of the con'rod 12 is applied on the above-mentioned plane I. Because of variations of the reciprocating inertia force of the piston 10 and the centrifugal force and reciprocating force of the con'rod 12 during one revolution of the crank shaft 11, the resultant force Fa does not become a constant load but becomes a variable load having the periodicity corresponding to one revolution of the crank shaft 11. On the other hand, because the distances between the centers of gravity of the upper and lower balance weights 18 and 19 and the rotation axis of the crank shaft 11 are fixed and the weights of the upper and lower balance weights 18 and 19 are also fixed, the centrifugal force Fb of the upper balance weight 18 and the centrifugal force Fc of the lower balance weight 19 do not vary during one revolution of the crank shaft 11. Thus, as shown in FIG. 9, only the coefficient C1 becomes constant during one revolution of the crank shaft 11, and the other coefficients C2 and C3 respectively vary during one revolution of the crank shaft 11 so as to take the maximum values C2MAX, C3MAX and the minimum values C2MIN, C3MIN.

Here, although in practice difficulty is similarly encountered to perfectly assume the dynamic balance therebetween during one revolution of the crank shaft 11, if setting the coefficient C1 to above 0.5 and satisfying the aforementioned equations (8) and (9), the compressing Unit takes a vibration mode where vibration becomes small at the vicinity of the plane I and becomes large at the lower portion of the crank shaft 11, because the moment applied to the lower portion of the crank shaft 11 becomes greater and the moment applied to the upper portion of the crank shaft 11, i.e., the vicinity of the crank eccentric portion 11a, become smaller. In this embodiment, since the compressing section 5 and the motor section 6 are supported through the springs 7 at the vicinity of the plane I where vibration is small, it becomes possible to further suppress the generation of noises due to the vibration from the compressing unit to the closed vessel 4 as compared with the above-described first embodiment.

Figure 10:
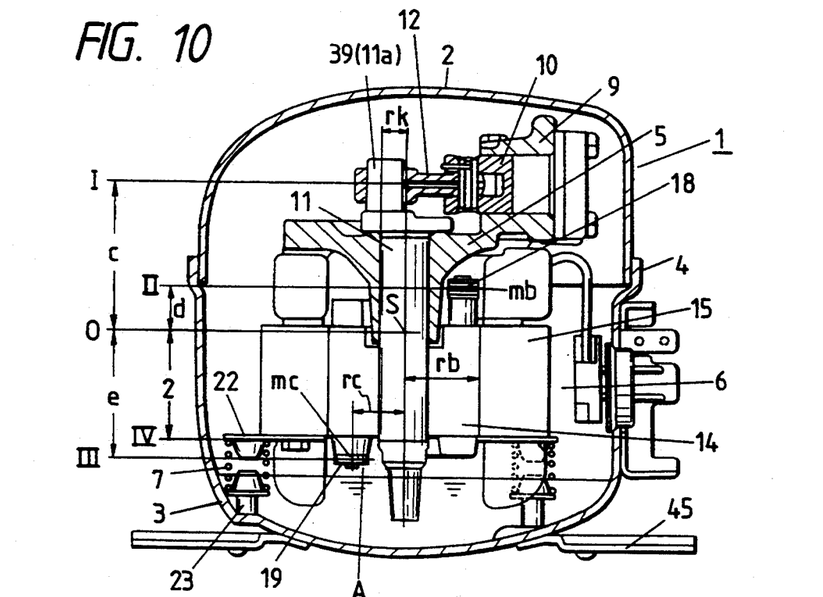
FIG. 10 is a cross-sectional view showing an arrangement of a hermetic compressor according to a fifth embodiment of this invention.

Further, a description will be made hereinbelow with reference to FIG. 10 in terms of a hermetic compressor according to a fifth embodiment of this invention. In FIG. 10, parts corresponding to those in the above-described embodiments are marked with the same numerals and the description thereof will be omitted for brevity. The hermetic compressor 1 similarly comprises a compressing section 5 at an upper portion and a motor section 6 at a lower portion which are encased in a closed vessel 4 comprising upper and lower shells 2 and 3, and includes upper and lower balance weights 18 and 19 provided on the upper and lower surfaces of a rotor 14 of the motor section 6. On a lower end portion of the stator 15 there is fixedly provided a spring-mounting plate 22 which is connected through springs 7 to stays 23.

The compressing unit comprising the compressing section 5 and the motor section 6 is arranged to have the center S of gravity existing in a reference plane O, and the crank pin 39 (crank eccentric portion 11a) of the crank shaft 11 is coupled to the con'rod 12 in the first plane I perpendicular to the axis of the crank shaft 11 and separated by a distance c from the reference plane O. A portion consisting of the crank pin 39, con'rod 12 and piston 10 has a mass M and has the center of gravity at a position separated by an eccentric distance rk from the axis of the crank shaft 11. The upper balance weight 18 is disposed in the second plane II between the first plane I and the reference plane O, the second plane II being perpendicular to the axis of the crank shaft 11. This balance weight 18 has a mass mb, and is arranged to have the center of gravity at a position separated by a distance rb from the axis of the crank shaft 11 and disposed at a position separated by a distance d from the reference plane O. On the other hand, the lower balance weight 19 is disposed in the third plane III perpendicular to the axis of the crank shaft 11 and existing at the opposite side to the second plane II with respect to the reference plane O. Further, the lower balance weight 19 has a mass mc, and is arranged to have the center of gravity at a position separated by a distance rc from the axis of the crank shaft 11 and disposed at a position separated by e from the reference plane O. The springs 7 are arranged to elastically act or operate with respect to the compressing unit in a fourth plane IV between the reference plane O and the third plane III. This fourth plane IV is separated by a distance z from the reference plane O.

Here, in this embodiment, the balance weights 18 and 19 are designed so that the ratios of the product of the mass mb and the distance rb and the product of the mass mc and the distance rc relative to the product of the mass M and the distance rk are in predetermined ranges whereby the radial vibration of the compressing unit in the fourth plane IV becomes extremely small. More specifically, the weights, position and others of the balance weights 18 and 19 are determined so that the value Nb obtained in accordance with the following equation (10) is in a range of 0.8 to 1.2 and the value Nc obtained in accordance with the following equation (11) is in a range of 0.1 to 0.5.

$$Nb = mb \cdot rb / M \cdot rk \qquad (10)$$

$$Nc = mc \cdot rc / M \cdot rk \qquad (11)$$

Figure 12:
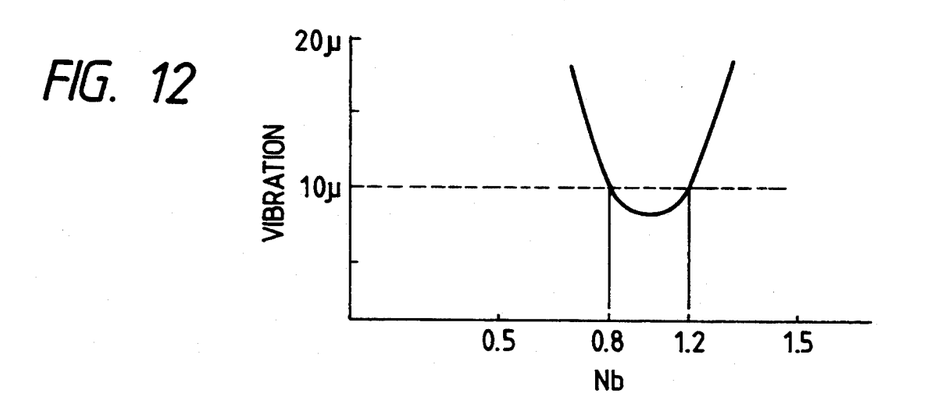
FIGS. 12 and 13 are graphic illustrations for describing vibrations of a leg portion of the hermetic compressor in the fifth embodiment on the basis of coefficients Nb and Nc.
Figure 13:
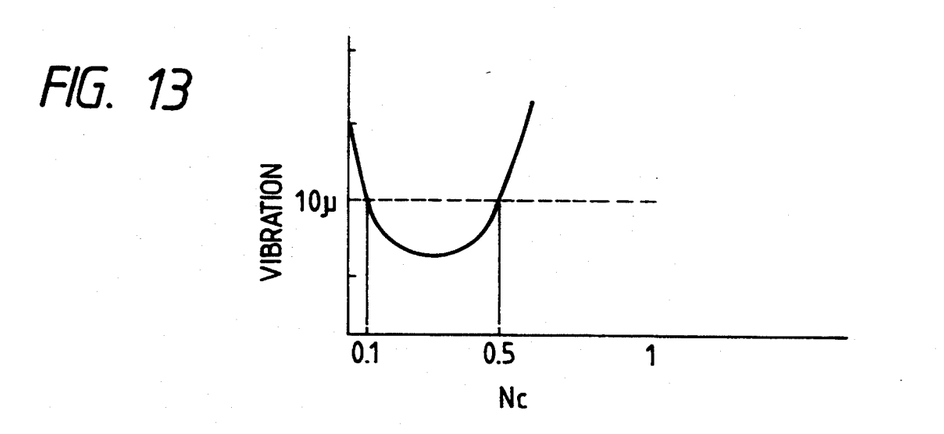

As shown in FIGS. 12 and 13, when the balance weights 18 and 19 are designed so as to satisfy these conditions, the vibration of a leg portion 45 of the compressor 1 becomes below a desired value (10 $\mu$m).

According to tests, for example, in a compressor having a cylinder 9 volume of 4.8 cm$^3$, the mass M of 73 g and the eccentric distance rk of 7.65 mm, when the balance weights are not provided on the rotor 14, the vibration of the spring-mounting plate 22 is 300 to 400 $\mu$m, and when the balance weights 18 and 19 are provided so that rb=19.5 mm, mb=32.4 g, rc=19.5 mm and mc=10.8 g, the vibration of the spring-mounting plate 22 becomes 50 to 80 $\mu$m smaller as compared with no provision of the balance weights, whereby the vibration of the leg portion 45 reduced through the springs 7 becomes about 8 $\mu$m below a desired value (10 $\mu$m).

Figure 11:
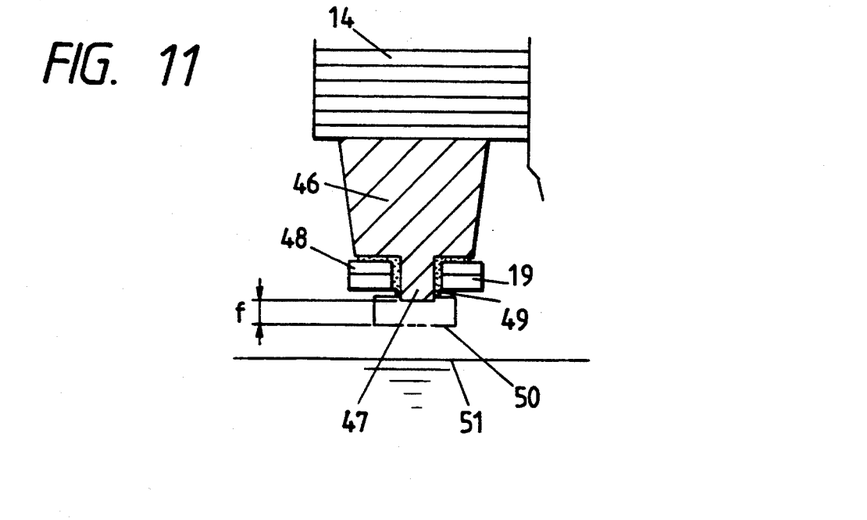
FIG. 11 is an enlarged view showing a portion indicated by A in FIG. 10.

According to this embodiment, since the third plane III passing through the balance weight 19 is disposed below the fourth plane IV in which the springs 7 act to the compressing unit, it is possible to sufficiently allow a space for the provision of the springs 7, thereby preventing the total height of the compressor 1 from increasing. As shown in FIG. 11 which is an enlarged view illustrating a portion indicated by character A in FIG. 10, the balance weight 19, being provided on the lower surface of the rotor 14, comprises a horn (downwardly projecting portion) 47 formed integrally with an end ring 46 of the rotor 14 and a counter weight 48 surrounding the horn 47. The horn 47 and the counter weight 48 are fixedly Connected through an adequate adhesive (for example, SW-2214 manufactured by Sumitomo 3M Co., Ltd.) 49 to each other. In a conventional balance weight, the horn 47 is constructed to be longer and a counter weight is fitted and caulked as indicated by a dotted line 50. Thus, according to this arrangement, the dimension of the balance weight 19 can be reduced by f, thereby reducing the total height of the compressor 1. In FIG. 11, numeral 51 represents an oil surface. It is also appropriate that the balance weight 19 is formed integrally with the end ring 46.

In this embodiment, the distances c, d, e and z are determined by taking an adequate rotational balance.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A compressor comprising:
a compressing section including a crank shaft having a crank eccentric portion, a con'rod and a piston, said piston being coupled through said con'rod to said crank eccentric portion of said crank shaft and inserted into a cylinder, and said crank eccentric portion being arranged to circularly move with respect to the axis of said crank shaft in accordance with rotation of said crank shaft to cause said piston to reciprocate within said cylinder;
a motor section comprising a rotor and stator and disposed at a lower side of said compressing section, said rotor being connected to said crank shaft so that said crank shaft is rotatable in response to driving of said motor section; and
first and second balance weights respectively provided on upper and lower portions of said rotor of said motor section, said first balance weight being positioned in a plane II perpendicular to the axis of said crank shaft and separated by a distance X from a plane I perpendicular to the axis of said crank shaft and including the axis of said piston, and said second balance weight being positioned in a plane III perpendicular to the axis of said crank shaft and separated by distance Y from said plane II,
wherein, when a resultant force of an inertia force of said piston, an inertia force and centrifugal force of said con'rod, and a centrifugal force of said crank eccentric portion in said plane I is taken to be Fa, a centrifugal force of said first balance weight in said plane II is taken to be Fb, and a centrifugal force of said second balance weight in the plane III is taken as Fc, said first and second balance weights are determined so that all of coefficients C1 to C3 given by the following equations become less than 3.

$$C1 = Fc \cdot (X+Y)/(Fb \cdot X) \qquad (1)$$

$$C2 = Fc \cdot Y/(Fa \cdot X) \qquad (2)$$

$$C3 = Fb \cdot Y/(Fa \cdot (X+Y)) \qquad (3)$$

2. A compressor as claimed in claim 1, wherein said compressing section and said motor section are encased in a vessel and supported at the vicinity of said plane III through spring means with respect to said vessel, said first and second balance weights are determined so that said coefficient C1 given by said equation (1) is below 1.5 and the following equations (4) and (5) are satisfied:

$$|C2MAX-1| < |C2MIN-1| \quad (4)$$

$$|C3MAX-1| < |C3MIN-1| \quad (5)$$

where C2MAX and C2MIN respectively represent maximum and minimum values of said coefficient C2 given in accordance with said equation (2) during one revolution of said crank shaft, and C3MAX and C3MIN respectively designate maximum and minimum values of said coefficient C3 given in accordance with said equation (3) during one revolution of said crank shaft.

3. A compressor as claimed in claim 1, wherein said compressing section and said motor section are encased in a vessel and supported at the vicinity of said plane II through spring means with respect to said vessel, said first and second balance weights are determined so that said coefficient C1 given by said equation (1) is $1 \pm 0.5$ and the following equations (6) or (7) are satisfied:

$$|C2MAX-1| \approx |C2MIN-1| \quad (6)$$

$$|C3MAX-1| \approx |C3MIN-1| \quad (7)$$

where C2MAX and C2MIN respectively represent maximum and minimum values of said coefficient C2 given in accordance with said equation (2) during one revolution of said crank shaft, and C3MAX and C3MIN respectively designate maximum and minimum values of said coefficient C3 given in accordance with said equation (3) during one revolution of said crank shaft.

4. A compressor as claimed in claim 1, wherein said compressing section and said motor section are encased in a vessel and supported at the vicinity of said plane I through spring means with respect to said vessel, said first and second balance weights are determined so that said coefficient C1 given by said equation (1) is equal to or greater than 0.5 and the following equations (8) or (9) are satisfied:

$$|C2MAX-1| > |C2MIN-1| \quad (8)$$

$$|C3MAX-1| > |C3MIN-1| \quad (9)$$

where C2MAX and C2MIN respectively represent maximum and minimum values of said coefficient C2 given in accordance with said equation (2) during one revolution of said crank shaft, and C3MAX and C3MIN respectively designate maximum and minimum values of said coefficient C3 given in accordance with said equation (3) during one revolution of said crank shaft.

5. A compressor comprising:
a compressing section including a crank shaft having a crank pin, a con'rod and a piston, said piston being coupled through said con'rod to said crank pin of said crank shaft in a first plane I perpendicular to the axis of said crank shaft, said crank pin being arranged to circularly move with respect to the axis of said crank shaft in accordance with rotation of said crank shaft to cause said piston to reciprocate within a cylinder, a portion having said crank pin, said con'rod and said piston has the center of gravity at a position separated by a distance rk from the axis of said crank shaft;

a motor section connected to a lower side of said compressing section and comprising a rotor and a stator, said rotor being connected to said crank shaft so that said crank shaft is rotatable in response to driving of said motor section; and first and second balance weights respectively provided on upper and lower portions of said rotor of said motor section, said first balance weight being positioned in a second plane II perpendicular to the axis of said crank shaft and existing between said first plane I and a reference plane O perpendicular to the axis of said crank shaft and passing through the center of gravity of a combination of said compressing section and said motor section, and first balance weight having the center of gravity at a position separated by a distance rb from the axis of said crank shaft, and said second balance weight being positioned in a third plane III perpendicular to the axis of said crank shaft and existing at the opposite side to said first plane I with respect to said reference plane O, and said second balance weight having the center of gravity at a position separated by a distance rc from the axis of said crank shaft; and spring means for elastically supporting said compressing section and said motor section in a fourth plane IV perpendicular to the axis of said crank shaft and existing at the opposite side to said first plane I with respect to said reference plane O, wherein, when a mass of said portion consisting of said crank pin, said con'rod and said piston is taken to be M, a mass of said first balance weight is taken as mb and a mass of said second balance weight is taken as mc, said first and second balance weights are determined on the basis of the product mb·rb, the product mc·rc and the product M·rk, wherein said first and second balance weights are determined so that values Nb and Nc given in accordance with the following equations (10) and (11) are respectively in first and second predetermined ranges:

$$Nb = mb \cdot rb / M \cdot rk \quad (10)$$

$$Nc = mc \cdot rc / M \cdot rk \quad (11)$$

wherein said first predetermined range is 0.8 to 1.2 and said second predetermined range is 0.1 to 0.5.

6. A compressor as claimed in claim 5, wherein said fourth plane IV is between said reference plane O and said third plane III.

7. A compressor as claimed in claim 5, wherein said second balance weight disposed on the lower portion of said rotor comprises a projecting portion integrally formed with an end ring of said rotor to protrude from said end ring and a counter weight disposed surrounding said projecting portion, said projecting portion and said counter weight being connected through an adhesive to each other.

* * * * *